US006740846B1

(12) United States Patent
Troitski et al.

(10) Patent No.: US 6,740,846 B1
(45) Date of Patent: May 25, 2004

(54) METHOD FOR PRODUCTION OF 3D LASER-INDUCED HEAD IMAGE INSIDE TRANSPARENT MATERIAL BY USING SEVERAL 2D PORTRAITS

(75) Inventors: Igor Troitski, 853 Arrowhead Trail, Henderson, NV (US) 89015; Karen Cashman, Las Vegas, NV (US)

(73) Assignee: Igor Troitski, Henderson, NV (US)

( * ) Notice: Subject to any disclaimer, the term of this patent is extended or adjusted under 35 U.S.C. 154(b) by 67 days.

(21) Appl. No.: 10/397,570

(22) Filed: Mar. 27, 2003

(51) Int. Cl.[7] .................................................. B23K 26/00

(52) U.S. Cl. .................................................. 219/121.69

(58) Field of Search ......................... 219/121.6, 121.68, 219/121.69, 121.76, 121.77, 121.85

(56) References Cited

U.S. PATENT DOCUMENTS

| | | | | |
|---|---|---|---|---|
| 3,715,734 A | | 2/1973 | Fajans | 340/173 LM |
| 4,092,518 A | | 5/1978 | Merard | 219/121 LM |
| 5,206,496 A | | 4/1993 | Clement et al. | 250/271 |
| RE35,029 E | * | 8/1995 | Sandor et al. | 355/22 |
| 5,575,936 A | | 11/1996 | Goldfarb | 219/121.68 |
| 5,637,244 A | | 6/1997 | Erokhin | 219/121.69 |
| 5,653,900 A | | 8/1997 | Clement et al. | 219/121.68 |
| 5,805,289 A | * | 9/1998 | Corby et al. | 356/613 |
| 5,886,318 A | | 3/1999 | Vasiliev et al. | 219/121.69 |
| 6,087,617 A | | 7/2000 | Troitski et al. | 219/121.6 |
| 6,322,958 B1 | | 11/2001 | Hayashi | |
| 6,333,486 B1 | | 12/2001 | Troitski | 219/121.69 |
| 6,392,683 B1 | | 5/2002 | Hayashi | |
| 6,399,914 B1 | | 6/2002 | Troitski | 219/121.69 |
| 6,417,485 B1 | | 7/2002 | Troitski | 219/121.69 |
| 6,426,480 B1 | | 7/2002 | Troitski | 219/121.69 |
| 6,509,548 B1 | | 1/2003 | Troitski | |

FOREIGN PATENT DOCUMENTS

| | | | |
|---|---|---|---|
| EP | 0743128 | A1 | 11/1996 |
| RU | 1838163 | | 3/1992 |
| RU | 20082288 | C1 | 2/1994 |
| RU | WO 96/30219 | | 3/1995 |
| SU | 321422 | | 11/1970 |

OTHER PUBLICATIONS

Troitski, "Image recording by laser–induced damages" Optical Memory and Neural Networks, vol. 9, No. 4, 2000.
Troitski, System for creation of laser–induced damage images and problems of their optimization, Proc. of SPIE, vol. 3902 (2000), 489–499.
Troitski, Experience of creation of laser–induced damage images, Proc. of SPIE, vol. 3902 (2000), 479–488.
Igor Troitski "Laser–induced damage creates interior images" OE Reports, No 191, Nov. 1999.
Troitski, "Method and laser system for creating high–resolution laser–induced damage images" Proc. of SPIE, vol. 4679 (2001), 392–399.

* cited by examiner

*Primary Examiner*—Samuel M. Heinrich

(57) ABSTRACT

A method for creating 3D laser-induced head image inside transparent material is disclosed. Initial information for this creation is several 2D portraits. Creation of 3D laser-induced head image has three stages. The first stage is the construction of 3D head model from corresponding principal parts detailed from given 2D portraits and creation of the bearing point arrangement by covering the model by equidistance points. This bearing point arrangement gives information only about spatial configuration of points. The second stage is transformation of the bearing point arrangement into point arrangement, which has more complete information about portraits. The third stage is production of a plurality of the etch points inside a transparent material by a laser beam, which is periodically focused at the points belonging to the transformed point arrangement.

10 Claims, 9 Drawing Sheets

METHOD FOR PRODUCTION OF 3D LASER-INDUCED HEAD IMAGE INSIDE TRANSPARENT MATERIAL BY USING SEVERAL 2D PORTRAITS

FIELD OF THE INVENTION

The present invention relates to methods for producing laser-induced images inside three-dimensional transparent media by using pulsed laser radiation.

BACKGROUND OF THE INVENTION

A number of techniques for creating a variety of patterns on the surface and inside of transparent substrates using pulsed laser radiation are well known.

The Russian invention No. 321422 to Agadjanov et. al. discloses a method of manufacturing decorative products inside a transparent material by changing the material structure by laser radiation. As disclosed, by moving a material relative to a focused laser beam, it is possible to create a drawing inside the material.

U.S. Pat. No. 3,715,734 to Fajans discloses a three-dimensional memory storage unit, which is prepared by carbonizing selected spots in a block of polymethylmethacrylate by means of a steeply converging laser beam. The energy of the beam is applied in pulses of such duration and at such intensity that carbonization takes place only at the focal point of the beam.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He—Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,653,900 to Clement, et al. discloses a method and an apparatus for making a moving body of material. In a preferred embodiment, the apparatus includes at least one movable galvanometer mirror capable of moving the laser beam to create a mark of a predetermined shape.

U.S. Pat. No. 5,886,318 to A. Vasiliev and B. Goldfarb discloses a method for laser-assisted image formation in transparent specimens, which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

U.S. Pat. No. 6,333,486 to Troitski discloses method and laser system for creation of laser-induced damages to produce high quality images. Accordance to the invention, a laser-induced damage is produced by simultaneously generating breakdowns in several separate focused small points inside the transparent material area corresponding to this etch point. Damage brightness is controlled by variation of a number of separate focused small points inside the transparent material area.

U.S. Pat. No. 6,417,485 to Troitski discloses method and laser system controlling breakdown process development and space structure of laser radiation for production of high quality laser-induced damage images. Accordance to the invention, at the beginning an applied laser radiation level just exceeds an energy threshold for creating a plasma condition in the material, and thereafter the energy level of the applied laser radiation is just maintain the plasma condition. Accordance to another method a laser generates a $TEM_{mn}$ radiation. The values of the integers m and n are controlled and determined so as to reproduce particular gray shades for a particular point of an image.

U.S. Pat. No. 6,399,914 to Troitski discloses methods and an apparatus for creating high quality laser-induced damage images. One or more embodiments of the invention comprise a method for producing laser-induced damage images inside the special transparent material containing special kinds of impurities, which decrease the damage threshold of the material. Colored laser-induced damage images are produced inside transparent materials containing color impurities. Laser radiation is focused inside the transparent material in such a way that focal area contains at least one said impurity. Other embodiments of the invention comprise a method and a system for producing laser-induced images by using two lasers. The first laser generates radiation, which heats the predetermined material area about a point, where breakdown should be produced, to the vitrify temperature. The second laser generates radiation, which creates breakdown in a point of the heated area after the area is heated to the vitrify temperature.

U.S. Pat. No. 6,426,480 to Troitski discloses the method and laser system for production of high quality single-layer laser-induced damage portraits inside transparent material. One or more embodiments of the invention comprise a method and a system for production of an etch point without focal area expansion connected with the focused beam refraction.

U.S. Pat. No. 6,509,548 B1 to Troitski discloses the method and laser system for production of high-resolution laser-induced damage images inside transparent material by generating small etch points. The method is based on generation of the initial electron density in the relatively large volume, creation of the breakdown at a small part of the said volume and control of the energy amount enclosed inside the plasma.

U.S. Pat. No. 6,509,548 B1 to Raevsky & Troitski discloses the method and laser system for generating laser radiation of specific temporal shape for production of high quality laser-induced damage images by serial combination of both generation regimes: a Q-switched mode and a free-running mode.

U.S. Pat. No. 6,322,958 to Hayashi discloses a marking method using a laser beam and laser marking apparatus for forming a marker in a transparent member. The laser beam is converged at the points of the material to form cracks, which have shape long in a direction perpendicular to an optical axis of the laser beam.

U.S. Pat. No. 6,322,958 to Hayashi discloses a method for making marks in a transparent material by using a laser. A mark is formed in the region of the object to be marked where the laser beam is focused. Generation of dirt caused by marking, rupturing of the object to be marked, and the like, can be prevented.

U.S. patent application Ser. No. 10/117,592 to Troitski et al. discloses the method for producing images containing laser-induced color centers and laser-induced damages. These color centers are produced in a result of photoionization generated by laser radiation with energy lower the breakdown threshold.

U.S. patent application Ser. No. 09/354,236 to Troitski discloses the laser-computer graphic system for generating portrait and 3-D sculpture reproductions inside optically transparent material.

U.S. patent application Ser. No. 10/016,013 to Troitski discloses the method for production of laser-induced damage images with special characteristics by creating damages of special space shape.

U.S. patent application Ser. No. 10/075,018 to Troitski discloses a system for high-speed production of high quality laser-induced damage images inside transparent materials.

U.S. patent application Ser. No. 09/354,236 to Troitski et al. discloses the method creating damage arrangement for production of 3D laser-induced damage portraits inside transparent materials.

U.S. patent application Ser. No. 10/251,740 to Troitski discloses the method for production of laser-induced images represented by incomplete data, which are supplemented during production.

U.S. patent application Ser. No. 29/165,478 to Troitski and Cashman shows the ornamental design for transparent material inside of which a 2D laser-induced damage portrait is placed on a spherical surface.

The publication "System for creation of laser-induced damage images and problems of their optimization" (I. N. Troitski, Proc. of SPIE Vol. 3902 (2000), 489–499) describes methods for generating 3D images and portraits allowing reproduction of them within an optically transparent material with the same resolution like computer images, without sharp point structure and without significant fluctuation of gray shades.

The publication "Experience of creation of laser-induced damage images" (I. N. Troitski, Proc. of SPIE Vol. 3902 (2000), 479–488) discloses the specific system for production of laser-induced damage images.

The publication "Image recording by laser-induced damages" (I. N. Troitski, Optical Memory and Neural Networks, Vol. 9, No. 4, (2000) 233–238) discusses the problems of laser-induced damage utilization for image recording.

The publication "Method and laser system for creating high-resolution laser-induced damage images" (I. N. Troitski, Proc. of SPIE Vol. 4679 (2002), 392–399) describes creation of small laser-induced damages without large star structure by the specific temporal radiation.

As it is possible to conclude from described above, Patents disclosing methods and systems for creation of laser-induced images can be combined into several groups:

1. The first group contains patents, which disclose image production by using ordinary laser and moving systems (Russian invention No. 321422, U.S. Pat. Nos. 3,715,734; 4,092,518; 5,206,496; 5,575,936; 5,637,244; 5,653,900; 5,886,318).
2. The second group contains patents, which disclose image production by using special laser and moving systems giving high-speed production (patent application Ser. No. 10/075,018)
3. The third group is patents, which disclose production of high quality laser-induced images by using laser systems, which are created specially for production of these images and which have special parameters (U.S. Pat. Nos. 6,333,486; 6,417,485; 6,399,914; 6,426,480; 6,509,548; 6,509,548).
4. The fourth group is patents, which disclose production of laser-induced images having peculiar characteristics (patent applications Ser. Nos. 10/117,592; 10/016,013; 10/170,074).
5. The fifth group is parents, which disclose computer-graphic methods and systems, creating the arrangements of points where laser radiation should be focused for production of laser-induced images inside transparent materials (U.S. Pat. No. 6,087,617; patent applications Ser. Nos. 09/354,236; 10/078,099; 10/251,740).

The present invention relates to the fifth group and discloses methods for creation of the point arrangement corresponding 3D head image by using several 2D portraits. The base of inventions mentioned above was a 3D image created by some way on a computer. For example, patent application Ser. No. 10/078,099 suggests: "the creation of the model is not subject of the invention and we suppose that the 3D computer model has been created".

The present invention discloses the complex method for production of laser-induced head image by simultaneous creation of 3D head image based on several 2D portraits, and its transformation into arrangement of etch points.

SUMMARY OF THE INVENTION

The present invention has its principal task to provide a method for production of laser-induced head image by creation of 3D head image, based on several 2D portraits and its transformation into arrangement of points in which the laser beam should be focused.

One or more embodiments of the invention comprise a method for creation of 3D head image based on several 2D portraits by composition of the head from separate elements so that the head being produced inside transparent material looks like original head.

One or more embodiments of the invention comprise a method for construction bead model using standard parts modernized so that they look like the corresponding parts of the original head.

One or more embodiments of the invention comprise a method for construction of bearing point arrangement by covering the 3D model by equidistance points, so that internal split of transparent material does not occur when laser radiation is focuses at these points.

One or more embodiments of the invention comprise a method creating the arrangement points for producing laser-induced head image by moving off the part of points from bearing arrangement and by brightness modulation of the remained points.

One or more embodiments of the invention comprise a method for the transformation of 2D portraits into multi-layer point arrangements depending on direction of laser beam concerning the 2D portrait.

DESCRIPTION OF THE DRAWINGS

*(FIGS. 2*a*, 2*b*, 2*c* are front, bottom and left plan view of the head, correspondingly).

FIGS. 4*a*, 4*b*, 4*c* are front, bottom and left plan view, correspondingly.

DETAILED DESCRIPTION OF THE INVENTION

Figure 1A:
FIGS. 1*a* and 1*b* show, correspondingly, the face and profile portraits, which are used for construction of the head model.
Figure 1B:

The invention discloses a method for creation of laser-induced head image inside optically transparent materials by using several 2D portraits. In general, the invention relates to methods, in which laser energy is utilized to generate laser-induced damages based on the breakdown phenomenon.

The laser-induced head image is a plurality of the etch points inside a transparent material created by a laser beam, which is periodically focused at predetermined points of the material. The areas around these points, in result of the interaction of the laser radiation with the transparent material, become visible: either the areas scatter the exterior light or they absorb the light. Very often, the scattering areas are produced by means of the laser-induced breakdown.

The first step of laser-induced head image production is creation of the applicable 3D model on a computer. This model can be created on a computer by using several 3D scanners or the large number of 2D portraits by using commercial program. However, for production of laser-induced head image, it is not necessary to create such accurate model. The point is that: 1) since minimal distance between adjacent etch points of laser-induced image is not equal to zero, total number of laser-induced points is smaller than total point number of the real image and therefore the spatial resolution of the image produced inside transparent material is smaller than the applicable real image; 2) the laser-induced image is created inside a transparent material, the refraction index of which is not equal to unity, so that observation of the image is accomplished by the distortions, which are depended on the shape of the transparent material. Consequently, method for production of laser-induced heads should include the creation of 3D head model accounting the particulars listed above.

Such appropriate 3D model can be constructed from separate parts corresponding to the original head. Such separate parts can be: standard faces; standard hair; ears; standard beard; moustaches; spectacles and so on. Using 2D portraits, every standard part is modernized so that it looks like the corresponding part of the original head. The appropriate 3D head model is created by unification of modernized parts. This 3D model is covered by equidistance points so that the distances between adjacent etch points are larger than the value $R_0$ (if the distance between adjacent damages is smaller than $R_0$, the internal split can occur). This covered 3D model gives information about only possible spatial arrangement of the etch points. The point arrangement, being created inside a transparent material, reproduces only main spatial shape of the head but does not transfer the information about the portrait. Thus, this point arrangement is only the base for creation of the right point arrangement. It is important that this point arrangement contains all possible points and therefore its transformation into the right point arrangement is produced by elimination of the points and by bright modulation of several points.

During this transformation it is necessary to take into account following factors:

1. When an observer looks at the left head side, he does not see etch points of the right head side (and vice versa). Obviously, it is possible if the left profile and the right profile have the etch points, the projections of which on the plane perpendicular to the head face coincide. Consequently, 2D images corresponding left and right profiles should be described by the identically located etch points. However, very often images of left and right head sides are not identical and then the features of the images are produced by variations of the brightness of corresponding etch points.
2. The value $R_0$ (the minimal distance between adjacent damages when the internal split of transparent material does not occur) depends on the direction of the laser beam during production. So the minimal distance between adjacent etch points located along the laser beam is larger than the minimal distance between adjacent etch points located athwart to the beam.

Thus, creation of 3D laser-induced head image has three stages. The first stage is construction of 3D head model from corresponding principal parts detailed from given 2D portraits and creation of the bearing point arrangement by covering the model by equidistance points. This bearing point arrangement gives information about only spatial configuration of points. The second stage is transformation of the bearing point arrangement into point arrangement, which has more complete information about portraits. The third stage is production of a plurality of the etch points inside a transparent material by a laser beam, which is periodically focused at the points belonging to the transformed point arrangement.

The method creating laser-induced head image inside optically transparent materials by using several 2D portraits comprises following steps:

Step 1. 2D portraits, which are used for construction of head model, are converted to 8-bit gray-scale and the number of gray shades of the images is reduced as much as possible without reducing substantially the quality of these images.

Step 2. The contours of these 2D portraits are picked out.

Step 3. The main parts of the constructed head model are picked out.

Step 4. The shapes of the main parts are modernized so that their contours coincide with the corresponding contours of the 2D portraits.

Step 5. The head model is constructed from main parts.

Step 6. The constructed head model is covered by equidistance points; minimal distance between these points larger than $R_0$ (the minimal distance between adjacent points when the internal split can not occur).

Step 7. Initial 2D portraits, which are perpendicular to the direction of the laser beam used during production of the laser-induced image, are transformed into multi-layer point arrangement so that each picture contains several planes (layers), distance between which is larger than the minimal distance $Z_0$ and distance between adjacent points of each layer is larger than $d_0$ ($Z_0$, $d_0$ are minimal distances, accordingly, between adjacent layers and adjacent points of each layer when the internal split can not occur).

Step 8. The sizes of initial 2D portraits, which coincide with direction of the laser beam, are decreased $Z_0/d_0$ times along laser beam direction and after that they are transformed into multi-layer point arrangement so that each picture contains several planes (layers), distance between which is larger than $d_0$ and distance between adjacent points of each layer is also larger than $d_0$.

Step 9. Points of the left profile are compared with points of the right profile; a point of the left profile, which does not have corresponding points of the right profile is left out, but the brightness of the adjacent point is increased proportionally to number of points moved off; analogous procedure is made with points of the right profile.

Step 10. Multi-layer point arrangements are projected on corresponding parts of 3D head model.

Step 11. Points of 3D head model, which are located in the area of multi-layer point arrangements, are left out.

Step 12. Equidistance point arrangement of Step 6 is compared with the multi-layer point arrangement of Step 11 and points of equidistance point arrangement of Step 6, which are inside areas of the multi-layer point arrangement of Step 11, are eliminated.

Step 13. The point arrangement of Step 12 is filtered so than all adjacent point of filtered arrangement have distance between them larger than $R_0$.

Step 14. Production of a plurality of the etch points inside a transparent material by using a laser beam which is periodically focused at the points belonging to the constructed point arrangement.

The following example illustrates this method for the case, when 3D head image is reconstructed by using two 2D portraits (face and profile).

Figure 2A:
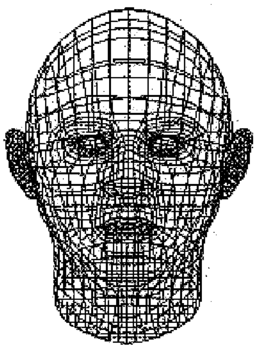
FIGS. 2*a*–2*c* show a man's head without hair, lineaments of which coincide with the corresponding lineaments of the face and the profile of FIGS. 1*c* and 1*d

Step 1. FIGS. 1*a* and 2*a* show, correspondingly, the face and profile portraits, which are used for construction of head model; the face portrait is converted to 8-bit gray-scale and the number of gray shades of the images is reduced so it has three level of gray shades.

Figure 1C:
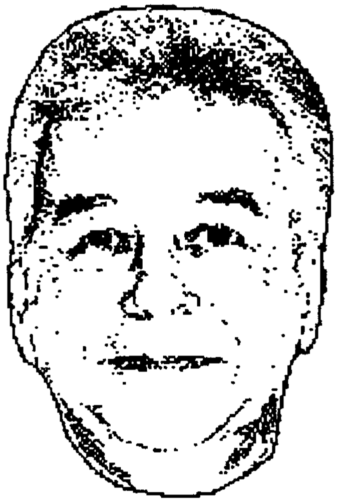
FIGS. 1*c* and 1*d* show lineament corresponding to face and profile portraits of FIG. 1*a* and 1*b*.
Figure 1D:

Step 2. FIGS. 1*c* and 1*d* show lineament corresponding to the face and profile portraits.

Figure 1E:
FIGS. 1*e*–1*g* show contours of main parts of the head image.
Figure 1F:
Figure 1G:

Step 3. For portraits of FIG. 1, the main parts of the constructed head model are man's head without the hair, standard hair and ears. FIGS. 1*e*–1*g* show contours of these main parts.

Figure 2B:
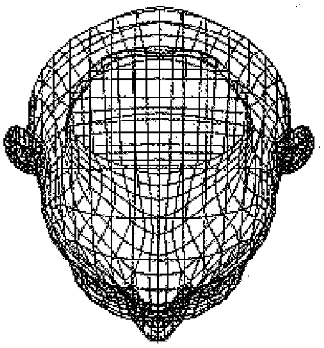
Figure 2C:
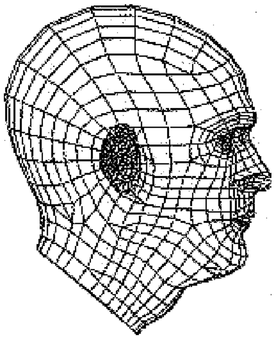
Figure 3A:
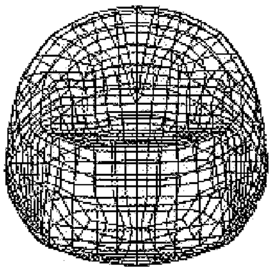
FIGS. 3*a*–3*c* show the hair; their front view coincides with the hair of the face (FIG. 1*c*) and their side view coincides with the hair of the profile (FIG. 1*f*).
Figure 3B:
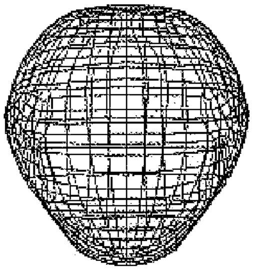
Figure 3C:
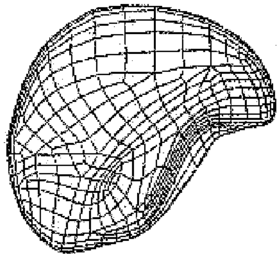

Step 4. FIGS. 2*a*–2*c* show the man's head without hair after its modernization. Lineament of the head model, coincided with the corresponding lineament of the face and the profile, is shown on FIGS. 1*c* and 1*d* (FIGS. 2*a*, 2*b*, 2*c* are front, bottom and left plan view, correspondingly). FIGS. 3*a*–3*c* show the hair; their front view coincides with the hair of face (FIG. 1*c*) and their side view coincides with the hair of profile (FIG. 1*f*). Analogously, the ear models are created.

Figure 4A:
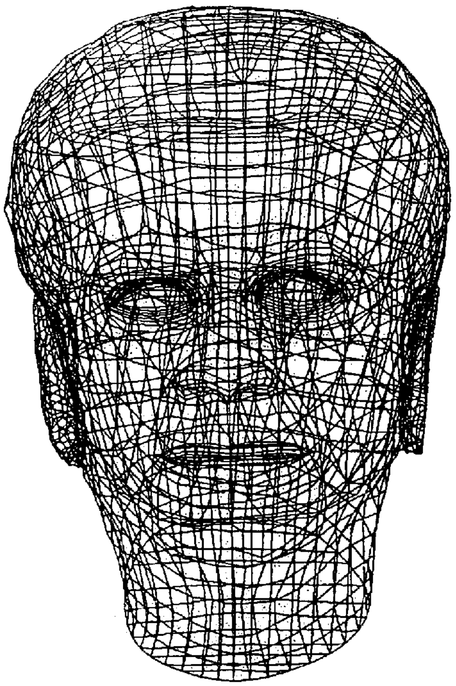
FIGS. 4*a*–4*c* show the head model constructed from models of the man's head, hair and ears.
Figure 4B:
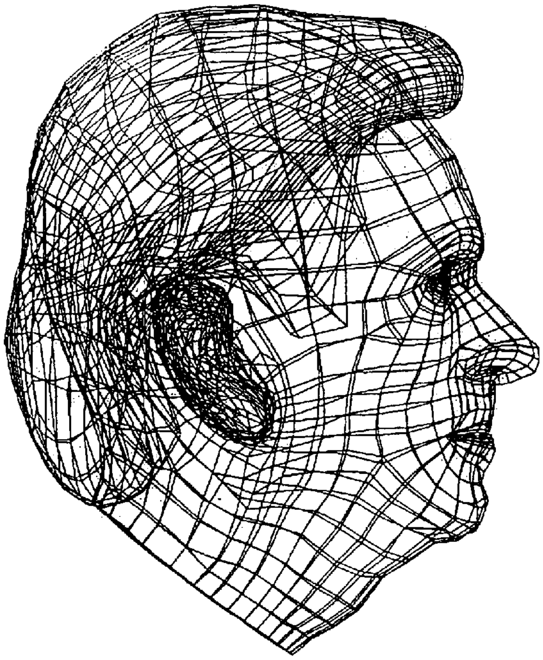
Figure 4C:
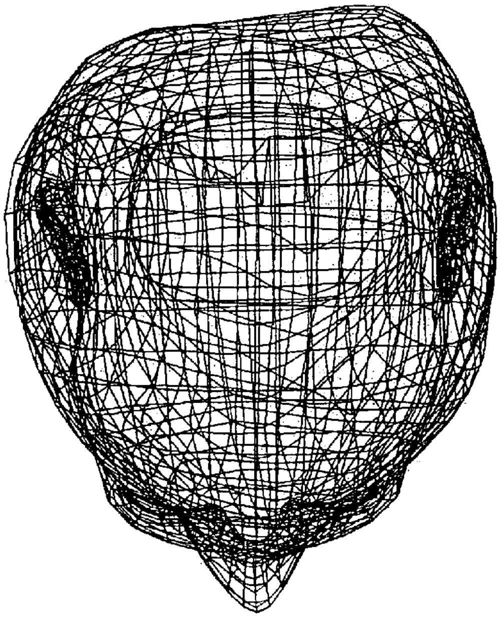

Step 5. FIGS. 4*a*–4*c* show the head model constructed from models of the man's head, the hair and the ears produced on previous step. FIGS. 4*a*, 4*b*, 4*c* are front, bottom and left plan view, correspondingly.

Figure 5A:
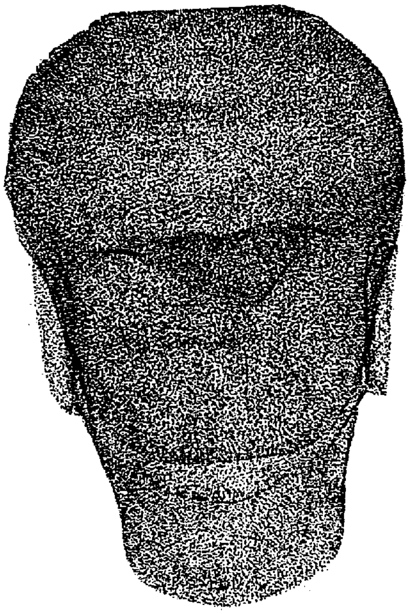
FIGS. 5*a*–5*c* show front, left and top elevations view of the head model covered by equidistance points.
Figure 5B:
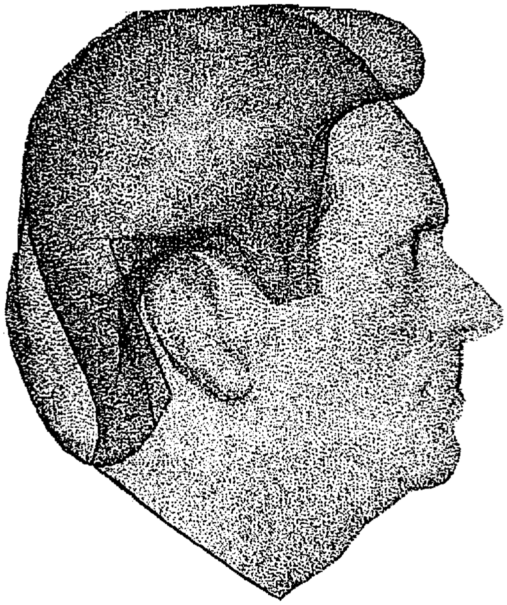
Figure 5C:
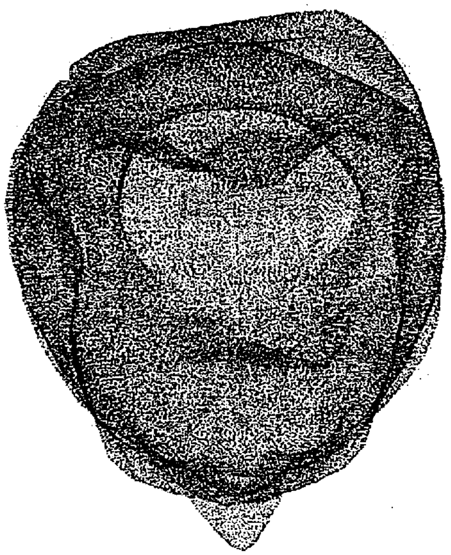

Step 6. FIGS. 5*a*–5*c* show front, left and top elevations view of the head model covered by equidistance points with minimal distance between them, which is larger than $R_0$ ($R_0$ is minimal distance between adjacent damages when the internal split can not occur). All these figures give information about only main spatial shape of the head but do not transfer the information about portraits. FIG. 5*a* shows the front elevation view of the head and we see that points of back hair do not give a chance to make out the lineament FIG. 5*b* shows the left elevation view of head. We see that the quality of this profile is lower than FIG. 1*b*.

Figure 6A:
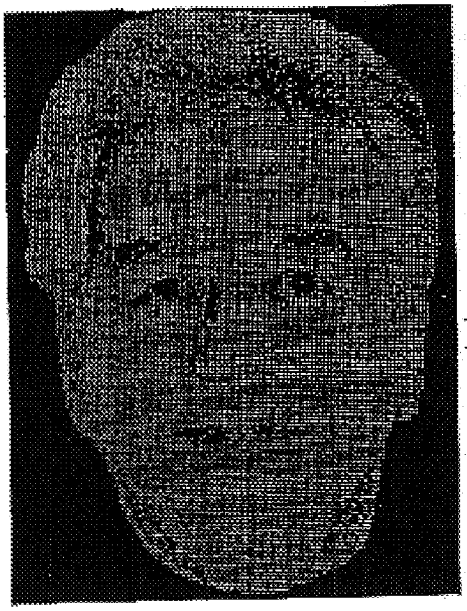
FIGS. 6*a*–6*c* show point arrangements of three layers.
Figure 6B:
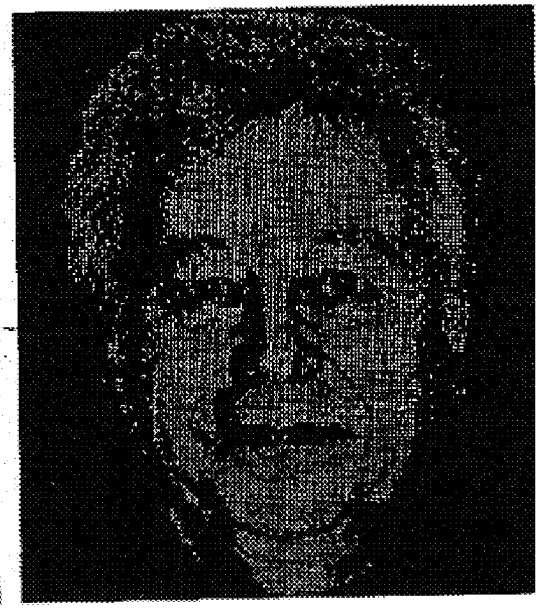
Figure 6C:
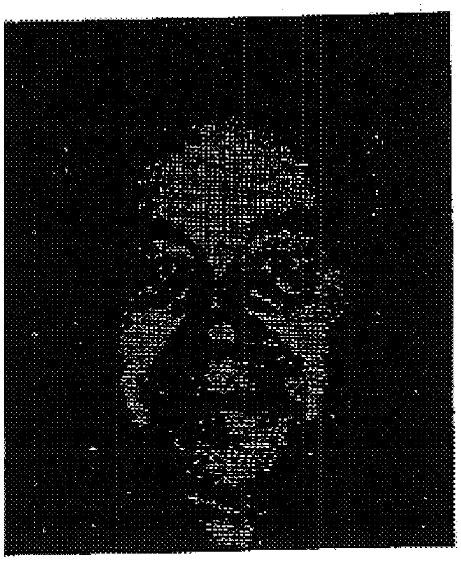
Figure 6D:
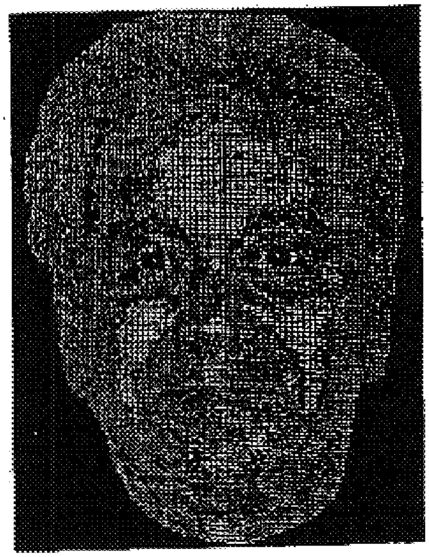
FIG. 6*d* shows initial front portrait transformed into multi-layer point arrangement by unification of arrangements of three layers of FIGS. 6*a*–6*c*.
Figure 7:
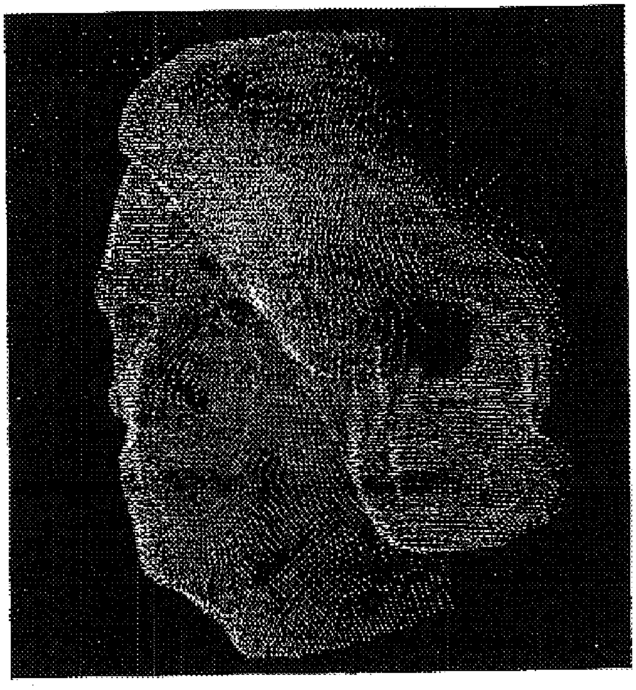
FIG. 7 shows point arrangement of FIG. 6*d* projected onto 3D head model.
Figure 8A:
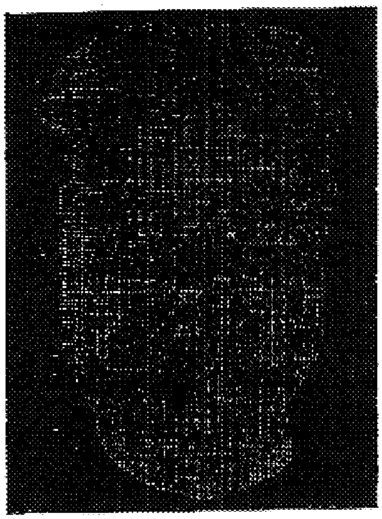
FIGS. 8*a*, 8*b* show point arrangement of 3D head model from front and side, correspondingly.
Figure 8B:
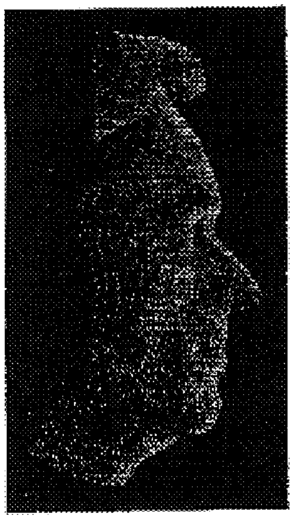

Step 7. Direction of laser beam during production of laser-induced image is selected so that it is perpendicular to the head face. FIGS. 6*a*–6*c* show point arrangements of three layers. The number of these layers is equal to the number of gray shades of front portrait (FIG. 1*a*). FIG. 6*d* shows initial front portrait transformed into multi-layer point arrangement by unification of arrangements of three layers so that distance between adjacent layers is larger than the value $Z_0$ and distance between adjacent points of each layer is larger than $d_0$ ($Z_0$, $d_0$ are minimal distances, accordingly, between adjacent layers and adjacent points of each layer when the internal split can not occur).

Figure 9A:
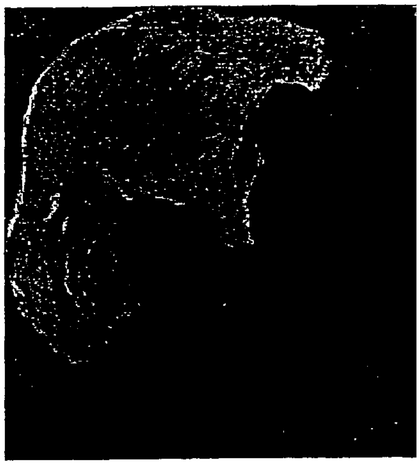
FIGS. 9*a*, 9*b* show the hair and ear images corresponding to FIGS. 1*a*, 1*b*.
Figure 9B:
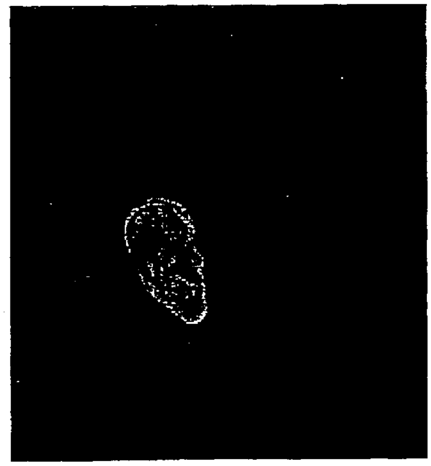
Figure 9C:
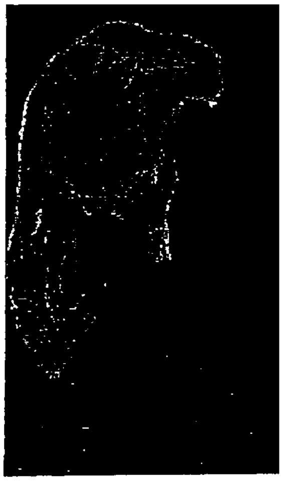
FIGS. 9*c*, 9*d* show the same images decreased along the beam direction.
Figure 9D:
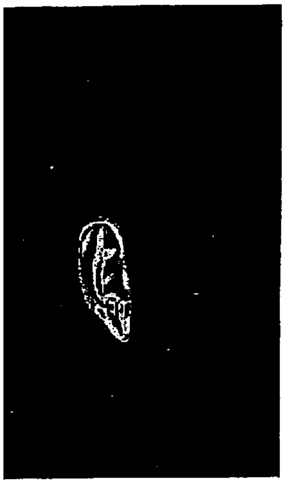

Step 8. The sizes of hair and ear images (FIGS. 9*a*, 9*b*), which coincide with direction of the laser beam, are decreased $Z_0/d_0$ times along laser beam direction and after that they are transformed into multi-layer point arrangement so that each picture contains several planes (layers), distance between which is larger than $d_0$ and distance between adjacent points of each layer is also larger than $d_0$.

Step 9. Points of the left profile are compared with points of the right profile; a point of the left profile, which does not have corresponding points of the right profile is left out, but the brightness of the adjacent point is increased proportionally to number of points moved off; analogous procedure is made with points of the right profile.

Points of the left hair image are compared with points of the right hair image; a point of the left hair image, which does not have corresponding points of the right hair image is left out, but the brightness of the adjacent point is increased proportionally to number of points moved off; analogous procedure is made with points of the ear images.

Figure 10A:
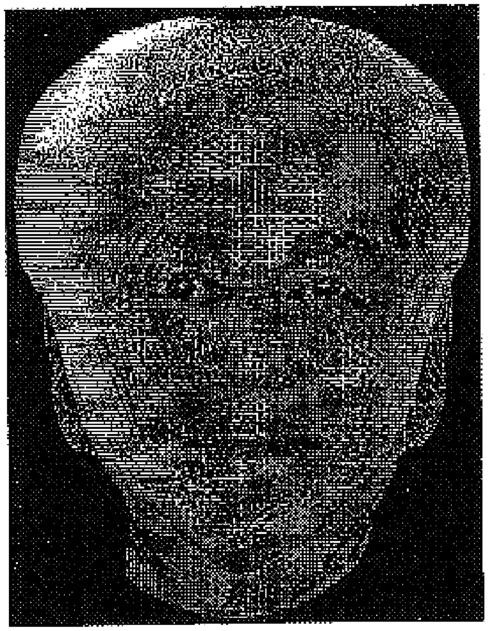
FIGS. 10*a* and 10*c* show the result of the point after projection of multi-layer images of all main head parts.
Figure 10B:
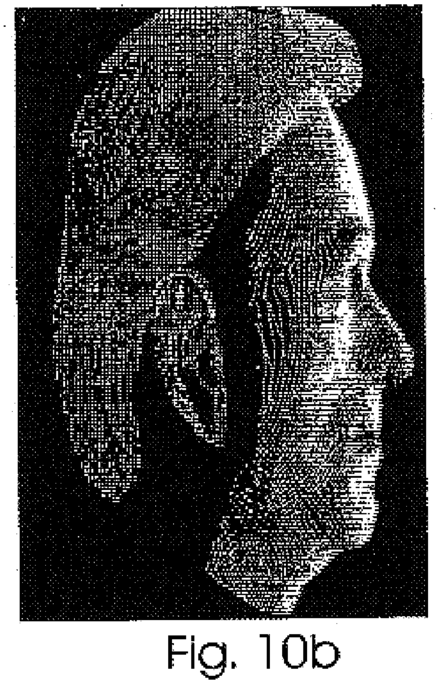
FIG. 10*b* shows the arrangement of points after moving out points, which belong to only right of only left profiles.

FIG. 10*b* shows the arrangement of points after elimination of points as it was described above.

Figure 10C:
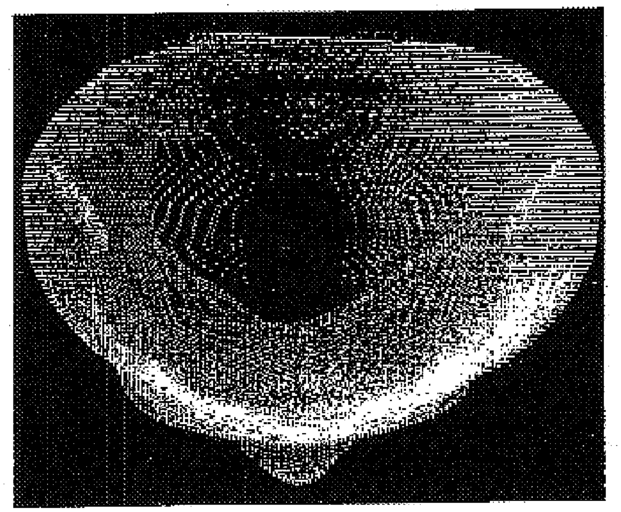

Step 10. Multi-layer point arrangements of the face portrait, hair and ear images are projected on corresponding parts of 3D head model. Points of 3D head model, which are located in the area of multi-layer point arrangements, are left out. FIGS. 10*a* and 10*c* show the result of the transformation.

Step 11. Equidistance point arrangement of Step 6 is compared with the multi-layer point arrangement of Step 10 and points of equidistance point arrangement of Step 6, which are inside areas of the multi-layer point arrangement of Step 9, are eliminated.

Figure 11A:
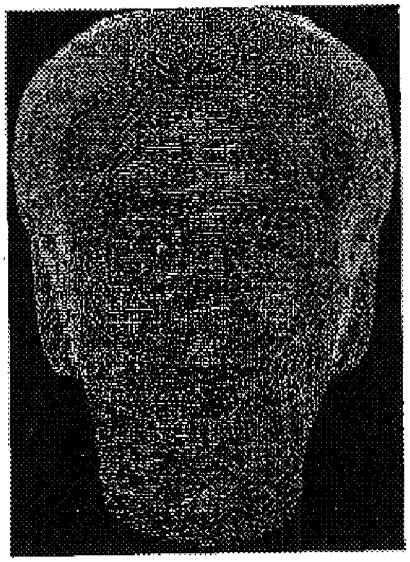
FIGS. 11*a* and 11*b* show the front view and left view of the point arrangement after filtration.
Figure 11B:
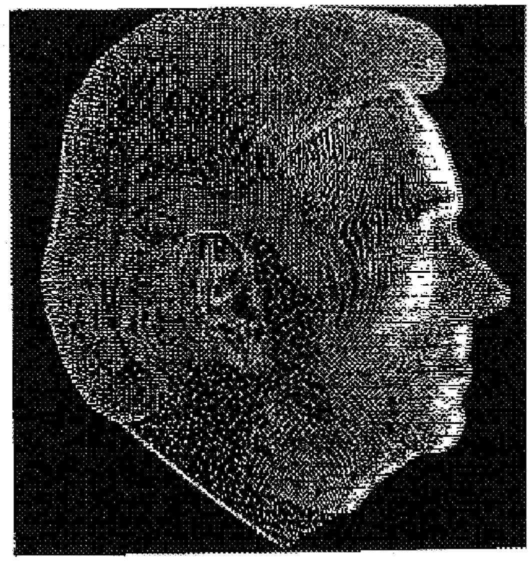

Step 12. The point arrangement of Step 10 is filtered so than all adjacent point of filtered arrangement have distance between them larger than $R_0$. FIGS. 11*a* and 11*b* show the front view and left view of the point arrangement after transformation made on steps 11*a* and 11*b*.

Figure 12A:
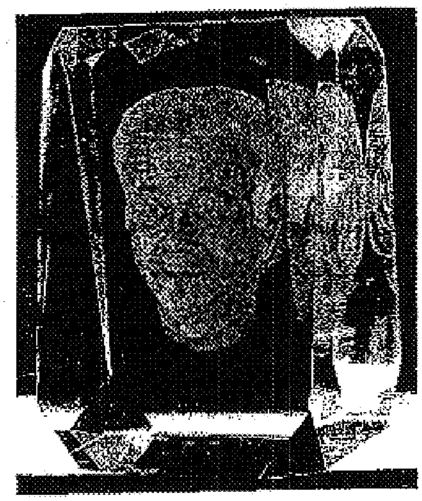
FIGS. 12*a* and 12*b* show corresponding 3D laser-induced head image produced inside a crystal.
Figure 12B:

The point arrangement shown on FIGS. 11*a* and 11*b* gives that points at which laser beam should be focused inside a transparent material for production of laser-induced image. FIGS. 12*a* and 12*b* show corresponding 3D laser-induced head image produced within crystal.

We claim:

1. A method for production of 3D laser-induced head image inside transparent material by using 2D portraits, comprising the steps of:

creating 3D head model so that its front view corresponds to the 2D face portrait and its side view corresponds to the 2D profile portrait;

creating the first aggregate of points, which gives the information about spatial configuration of 3D head image; all points of the first point arrangement are located on the surface of 3D head model, so that laser-induced breakdowns can be produced at the transparent material points, corresponding to the points of the first aggregate, without internal split;

transforming the first point aggregate into the second point arrangement, so that the second point arrangement keeps information about spatial configuration of 3D head image and contains complete information about 2D portraits, which are used for creation of 3D head model; all points of the second point arrangement are located in the area of the 3D head model so that laser-induced breakdowns being produced at the transparent material points, corresponding to the points of the second arrangement, do not generate internal split of the transparent material;

generating laser-induced breakdowns at the transparent material points corresponding to the points of the second arrangement.

2. A method in accordance with claim 1, wherein 3D head image is created so that its front view corresponds to the 2D face portrait and its side view corresponds to the 2D profile portrait, comprising:

creation of the standard 3D head model;

decomposition of the standard 3D head model on several main parts;

modernization of the said main parts so that they look like corresponding parts of the 2D portraits;

construction of the 3D head model from the said modernized parts.

3. A method in accordance with claim 1 wherein point arrangement, determining the points of the transparent material, where the laser-induced breakdowns should be generated, is formed by creation of the first point aggregate and by subsequent transformation of the first point aggregate into the second point arrangement, so that the first point aggregate gives information about spatial configuration of 3D head image and the second point arrangement keeps information about spatial configuration of 3D head image and contains complete information about 2D portraits.

4. A method in accordance with claim 3 wherein the first point aggregate is transformed into the second point arrangement, comprising:

transformation of 2D portraits into multi-layer point arrangements;

projection of the multi-layer point arrangements onto 3D head model;

elimination of points of the first point aggregate, which are inside the areas containing points of the multi-layer point arrangements after their projection onto 3D head model;

filtration of the total point arrangement, so that distances between adjacent points are larger than the minimal values, which depend on the characteristics of the laser radiation and the transparent material.

5. A method in accordance with claim 4 wherein transformation of 2D portraits into multi-layer point arrangements and minimal distances between adjacent points depend on the direction of the laser beam used for generation of laser-induced breakdowns inside transparent material at the points corresponding to the points of the said multi-layer point arrangements.

6. A method in accordance with claim 5 wherein 2D portrait, which is perpendicular to the direction of the laser beam used during production of the laser-induced image, is transformed into multi-layer point arrangement so that the portrait contains several planes (layers), distance between which is larger than the minimal distance $Z_0$ and distance between adjacent points of each layer is larger than $d_0$ ($Z_0$ is minimal distance along the laser beam and $d_0$ is minimal distance perpendicular to the laser beam, so that if distances between adjacent laser-induced damages are larger than these values, the internal split of the transparent material does not arise).

7. A method in accordance with claim 5 wherein 2D portrait, which is located along the laser beam used during production of the laser-induced image, is transformed into multi-layer point arrangement so that the portrait contains several planes (layers), distance between which is larger than the minimal distance $d_0$ and distance between adjacent points of each layer is larger than $Z_0$.

8. A method in accordance with claim 6 wherein laser-induced 3D image is the arrangement of laser-induced damages located on the surface and inside (or outside) of 3D model, so that the distances between the adjacent damages are larger than $Z_0$, $d_0$ ($Z_0$ is distances along laser beam and $d_0$ is distance perpendicular to the laser beam).

9. A method in accordance with claim 4 wherein transformation of 2D profile portraits into multi-layer point arrangements is produced so that both 2D profile portraits are described by the points, which have the same projection on the plane parallel to profile portraits, and difference between left and right profiles is reproduced by the modulation of the brightness of the corresponding laser-induced damages.

10. A method in accordance with claim 1 wherein creation of 3D laser-induced head image is produced by the following steps:

Step 1. Reduction of the number of gray shades of 2D portraits used for creation of 3D head image;

Step 2. Separation of the main parts of the said 2D portraits;

Step 3. Decomposition of the standard 3D head model and separation of its main parts;

Step 4. Modernization of the main parts of the head model, so that their contours coincide with the corresponding contours of the main parts of 2D portraits;

Step 5. Construction of the new head model from the said modernized main parts;

Step 6. Creation of the first point aggregate, so that its points are located on the surface of the new head model and distances between adjacent points are larger than the minimal value;

Step 7. Determination of the laser beam direction used for generation of the laser-induced breakdowns in the production of laser-induced 3D head image;

Step 8. Transformation of 2D portrait, which is perpendicular to the direction of the laser beam into multi-layer point arrangement so that the portrait contains several planes (layers), distance between which is larger than the minimal distance $Z_0$ and distance between adjacent points of each layer is larger than $d_0$;

Step 9. Transformation of 2D portrait, the location of which coincides with the direction of the laser beam into multi-layer point arrangement so that the portrait contains several planes (layers), distance between which is larger than the minimal distance $d_0$ and distance between adjacent points of each layer is larger than $Z_0$;

Step 10. Comparison of the multi-layer point arrangements corresponding to the portraits of left and right profiles and elimination of points of the left profile, which do not have corresponding points on the right profile; the brightness of the adjacent points is increased proportionally to number of points which have been eliminated; analogous procedure is made with points of the multi-layer point arrangement corresponding to the portrait of the right profile;

Step 11. Projection of multi-layer point arrangements onto new 3D head model;

Step 12. Elimination of points of the first point aggregate, which are located in the area of multi-layer point arrangements;

Step 13. Creation of the second point arrangement by filtration of the point arrangement constructed on Step 12, so than distances between adjacent points are larger than minimal distances $Z_0$ and $d_0$, perpendicular and along laser beam, accordingly;

Step 14. Generating laser-induced breakdowns at the transparent material points corresponding to the points of the second arrangement.

* * * * *